US009006303B2

(12) United States Patent
Zhang et al.

(10) Patent No.: US 9,006,303 B2
(45) Date of Patent: Apr. 14, 2015

(54) MESOPOROUS POLYMER COLLOIDS

(75) Inventors: Yugen Zhang, Singapore (SG); Jackie Y. Ying, Singapore (SG); Pranab K. Singapore, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 919 days.

(21) Appl. No.: 12/530,450

(22) PCT Filed: Mar. 8, 2007

(86) PCT No.: PCT/SG2007/000067
§ 371 (c)(1),
(2), (4) Date: Mar. 10, 2010

(87) PCT Pub. No.: WO2008/108738
PCT Pub. Date: Sep. 12, 2008

(65) Prior Publication Data
US 2010/0210744 A1    Aug. 19, 2010

(51) Int. Cl.
C08F 14/00 (2006.01)
B01J 31/16 (2006.01)
(Continued)

(52) U.S. Cl.
CPC ............ *B01J 31/1625* (2013.01); *B01J 20/265* (2013.01); *B01J 20/267* (2013.01); *B01J 20/28057* (2013.01); *B01J 20/28071* (2013.01); *B01J 20/28073* (2013.01); *B01J 20/28083* (2013.01); *B01J 20/28092* (2013.01); *B01J 20/285* (2013.01); *B01J 21/08* (2013.01); *B01J 31/0234* (2013.01); *B01J 31/0237* (2013.01); *B01J 31/0244* (2013.01); *B01J 31/063* (2013.01); *B01J 31/067* (2013.01); *B01J 31/1658* (2013.01); *B01J 37/0018* (2013.01);

*B01J 2231/32* (2013.01); *C08F 212/08* (2013.01); *C08J 9/26* (2013.01);
(Continued)

(58) Field of Classification Search
USPC .............. 521/73, 75, 134, 139, 140, 141, 146
See application file for complete search history.

(56) References Cited

U.S. PATENT DOCUMENTS 5,416,124 A * 5/1995 Stringfield ..................... 521/146
6,693,159 B1 2/2004 Holmes et al.
(Continued)

FOREIGN PATENT DOCUMENTS

EP         0366252 A1    5/1990
EP         1 207 572 A1  5/2002
(Continued)

OTHER PUBLICATIONS

Preparation of Magnetite Nanoparticles in Mesoporous Copolymer Template., Rabelo et al., Nano Lett., vol. 1, No. 2, 2001.*
(Continued)

*Primary Examiner* — Michael L Leonard
(74) *Attorney, Agent, or Firm* — Kilpatrick Townsend & Stockton LLP

(57) ABSTRACT

The invention provides a particulate material comprising porous polymeric microparticles having a mesoporous structure. A process for making the particles is also presented. The process comprises impregnating a porous microparticulate template material with a liquid comprising one or more monomers. The one or more monomers are then polymerized in and/or on the template material to form a polymer, and the template material is then removed to produce the particulate material.

15 Claims, 4 Drawing Sheets

(51) Int. Cl.
| | |
|---|---|
| B01J 20/26 | (2006.01) |
| B01J 20/28 | (2006.01) |
| B01J 20/285 | (2006.01) |
| B01J 31/02 | (2006.01) |
| B01J 31/06 | (2006.01) |
| B01J 37/00 | (2006.01) |
| C08F 212/08 | (2006.01) |
| C08J 9/26 | (2006.01) |
| B01J 21/08 | (2006.01) |

(52) U.S. Cl.
CPC ... *C08J 2201/024* (2013.01); *C08J 2201/0442* (2013.01); *C08J 2205/048* (2013.01); *C08J 2325/04* (2013.01)

(56) References Cited

U.S. PATENT DOCUMENTS

| | | | |
|---|---|---|---|
| 6,881,804 | B1 | 4/2005 | Sellergren et al. |
| 2004/0138432 | A1* | 7/2004 | Viklund et al. ............... 530/417 |
| 2005/0130827 | A1 | 6/2005 | Schunk et al. |
| 2006/0182942 | A1 | 8/2006 | Valle et al. |

FOREIGN PATENT DOCUMENTS

| | | |
|---|---|---|
| JP | 02-169607 A | 6/1990 |
| JP | 09-262430 A | 10/1997 |
| JP | 2003-514051 A | 4/2003 |
| JP | 2006-152263 A | 6/2006 |
| JP | 2006-518405 A | 8/2006 |
| WO | WO 01/32760 A1 | 5/2001 |
| WO | WO 01/78925 | 10/2001 |
| WO | WO 2004/041398 | 5/2004 |
| WO | WO 2006/135339 | 12/2006 |

OTHER PUBLICATIONS

"Synthesis of magnetite nanoparticles in hydrophobic styrene-divinylbenzen copolymer templates", Andrade et al. Journal of Magnetism and Magnetic Materials 289 (2005) 25-27.*

"Preparation and Characterization of Bimodal Porous Carbons Derived from a Styrene-Divinylbenzene Copolymer" to Li et al. Adsorption 3, 67-69 (1996).*

"Porogen and Cross-Linking Effects on the Surface Area, Pore Volume Distribution, and Morphology of Macroporous Polymers Obtained by Bulk Polymerization" to Santora et al. Macromolecules 2001, 34, 658-661.*

International Search Report dated May 25, 2007, in related International Application No. PCT/SG2007/000067, filed Mar. 8, 2007.

Han et al., "Pressure-Driven Enzyme Entrapment in Siliceous Mesocellular Foam," 2006, Chem. Mater. 18, 643-649.

Choi et al., "Controlled polymerization in mesoporous silica toward the design of organic-inorganic composite nanoporous materials," 2005, J. Am. Chem. Soc., 127, 1924-1932.

Johnson et al., "Ordered Mesoporous Polymers of Tunable Pore Size form colloidal Silica Templates," 1999, Science, vol. 283, 963-965.

Lancaster et al., "Effect of Surface Modification on the Reactivity of MCF-supported IndaBOX," 2005, Chem. Commun. 3577-3579.

Lee et al., "Improved Enantioselectivity of Immobilized Chiral Bisoxazolines by Partial Precapping of the Siliceous Mesocellular Foam Support with Trimethylsilyl Groups," 2006, Adv. Synth. Catal. 348, 1248-1254.

Lee et al., "Synthesis of new nanoporous carbon materials using nanostructured silica materials as templates," 2003, Journal of Materials Chemistry, www.rsc.org/materials, 9 pages.

Luo et al., "Functionalized chiral ionic liquids as highly efficient asymmetric organocatalysts for Michael addition to nitroolefins," 2006, Angew. Chem. Int. Ed., 45, 3093-3097.

Schmidt-Winkel et al., "Mesocellular Siliceous Foams with Uniformly Sized Cells and Windows," 1999, J. Am. Chem. Soc., 121, 254-255.

Schmidt-Winkel et al., "Microemulsion Templating of Siliceous Mesostructured Cellular Foams with Well-Defined Ultralarge Mesopores," 2000, Chem. Mater., 12, 686-696.

Sherrington, "Polymer-Supported Reagents, Catalysts, and Sorbents: Evolution and Exploitation—A Personalized View," 2001, Journal of Polymer Science, Part A: Polymer Chemistry, vol. 39, 2364-2377.

"Micro," Hawley's Condensed Chemical Dictionary, 14th Edition, John Wiley & Sons, Inc., New York, 2001, p. 750.

* cited by examiner

US 9,006,303 B2

MESOPOROUS POLYMER COLLOIDS

This application is the U.S. National Phase entry under 35 U.S.C. §371 and claims the benefit of International Application No. PCT/SG2007/000067, filed Mar. 8, 2007, the entire contents of which are hereby incorporated herein by reference.

TECHNICAL FIELD

The present invention relates to mesoporous polymer microparticles, to processes for making them and to uses thereof.

BACKGROUND OF THE INVENTION

In the past few years, there has been a tremendous increase in research activities on organocatalysis, especially chiral organocatalysis. Likewise, there is also a lot of interest in heterogeneous organocatalysis. However, supported organocatalysts are much less successful than heterogeneous organometallic catalysts partly because the organocatalysts are more sensitive to the chemical environment of the solid support.

Although a range of chiral ligands and their transition metal complexes have been developed and many of them are known to be highly effective in various asymmetric transformations, most chiral synthons are still produced from natural chiral building blocks or through resolution of racemic mixtures. Separation and recycling of expensive chiral catalysts are a major challenge preventing homogeneous asymmetric catalysts from being adopted more widely in industrial processes. However, this problem may be solved by converting homogeneous catalysts to heterogeneous catalysts through catalyst immobilization on an insoluble solid supports. For example, a pyrrolidine-based catalytic system has been well developed, and was successfully applied to a significant number of asymmetric transformations. However, developing a highly efficient heterogenized pyrrolidine organocatalysts remained a significant challenge.

Polymers and porous silica are commonly used as catalyst supports. A problem with heterogeneous catalysis is diffusion limitation: mass transfer (e.g. transfer of reagents) from the liquid phase to the active sites on the solid surface is a significant rate limiting process for the reaction. Mesoporous silica has superior physical properties: it has a robust, porous structure with high surface areas. For example, mesocellular foam has interconnected ultralarge pores (up to 30 nm) that further reduce the diffusion limitation problem. It is also possible to derive mesoporous silica in uniform, spherical particle morphology, facilitating the use of such material in packed bed reactors for continuous flow type processes. However, silica supports have surface silanol groups that tend to interact strongly with catalytic complexes. Thus, catalysts frequently suffer from decrease in catalyst activity and/or selectivity after immobilization on silica supports, and would require a multi-step catalyst immobilization process. Polymer supports do not have these problems, but are hitherto not characterized by well-defined, ultralarge pores. Diffusion limitation and polymer swelling remain as disadvantages despite the development of large-pore resins, low-swelling polymers, and mesoporous polymers.

OBJECT OF THE INVENTION

It is an object of the present invention to substantially overcome or at least ameliorate one or more of the above disadvantages.

SUMMARY OF THE INVENTION

In a first aspect of the invention there is provided a particulate material comprising porous polymeric microparticles having a mesoporous structure.

The particulate material may be a microparticulate material. The polymeric microparticles may comprise a crosslinked polymer. The particulate material may comprise crosslinking monomer units and non-crosslinking monomer units. The crosslinked polymer may have a ratio of crosslinking monomer units to non-crosslinking monomer units of at least about 1:4 on a mole or weight basis. At least one type of the crosslinked monomer units may be derived from divinyl benzene. At least one type of the non-crosslinked monomer units may be derived from styrene or a derivative thereof. The particulate material may comprise at least one monomer unit having a functional group. The functional group may be selected from the group consisting of a catalytic group and a functional group capable of being converted into a catalytic group. The catalytic group may be, or may comprise, a pyrrolidine group, which may optionally be a substituted pyrrolidine group. The functional group capable of being converted into a catalytic group may be, or may comprise, a chloride group, a chloromethyl group or a carboxylic acid group. The monomer unit having the functional group may be a non-crosslinking monomer unit. The monomer unit having the functional group may be a crosslinking monomer unit.

The particulate material may be a microparticulate material. The mesoporous structure may have a bimodal distribution of pore sizes. The particulate material may have pores sizes between about 1 and about 10 nm and pore sizes between about 10 and about 30 nm. The pore size distribution may be measured by nitrogen absorption. The particulate material may have a BET surface area of between about 100 and about 1000 m²/g. It may have a pore volume of between about 0.1 and about 1 ml/g.

The particulate material may comprise less than about 5% inorganic material. It may swell less than 1% at 20° C. in common organic solvents.

In an embodiment there is provided a particulate material comprising porous polymeric microparticles having a mesoporous structure, said microparticles comprising a crosslinked polymer.

In another embodiment there is provided a particulate material comprising porous polymeric microparticles having a mesoporous structure, said microparticles comprising a crosslinked polymer having at least one monomer unit having a functional group selected from the group consisting of a catalytic group and a functional group capable of being converted into a catalytic group.

In another embodiment there is provided a particulate material comprising porous polymeric microparticles having a mesoporous structure, said microparticles comprising a crosslinked polymer and comprising less than about 5% inorganic material.

In another embodiment there is provided a particulate material comprising porous polymeric microparticles having a mesoporous structure, said microparticles comprising a crosslinked polymer having at least one monomer unit having a functional group selected is from the group consisting of a catalytic group and a functional group capable of being converted into a catalytic group and said polymer comprising less than about 5% inorganic material.

In a second aspect of the invention there is provided a process for making a particulate material comprising porous polymeric microparticles, said process comprising:

a) impregnating a porous microparticulate template material with a liquid comprising one or more monomers;
b) polymerising the one or more monomers in and/or on the template material to form a polymer; and
c) removing the template material to produce the particulate material, said particulate material comprising the polymer.

The microparticulate template material may be inorganic. It may be mesocellular siliceous foam. It may be microparticulate mesocellular siliceous foam. The liquid may comprise a crosslinking monomer and a non-crosslinking monomer. The molar ratio of the crosslinking monomer to the non-crosslinking monomer may be at least about 1:2. The weight ratio of the crosslinking monomer to the non-crosslinking monomer may be at least about 1:2. The crosslinking monomer may comprise divinyl benzene. The non-crosslinking monomer may comprise styrene or a derivative thereof.

In some embodiments, at least one of the monomers comprises either a catalytic group or a functional group capable of being converted into a catalytic group.

The liquid may comprise a thermal initiator. In this case, step b) comprises heating the liquid in and/or on the template material so as to polymerise the monomer(s).

Step c) may comprise dissolving the template material in a solvent which does not dissolve the polymer.

The process may additionally comprise the step of:
d) reacting the polymer so as to introduce catalytic groups onto the surface of the particles of the particulate material.

In an embodiment there is provided there is provided a process for making a particulate material comprising porous polymeric microparticles, said process comprising:
a) impregnating a porous inorganic microparticulate template material with a liquid comprising one or more monomers;
b) polymerising the one or more monomers in and/or on the template material to form a polymer; and
c) removing the template material to produce the particulate material, said particulate material comprising the polymer.

In another embodiment there is provided a process for making a particulate material comprising porous polymeric microparticles, said process comprising:
a) impregnating microparticulate mesocellular siliceous foam with a liquid comprising one or more monomers;
b) polymerising the one or more monomers in and/or on the foam to form a polymer; and
c) removing the foam to produce the particulate material, said particulate material comprising the polymer.

In another embodiment there is provided a process for making a particulate material comprising porous polymeric microparticles, said process comprising:
a) impregnating microparticulate mesocellular siliceous foam with a liquid comprising one or more monomers;
b) polymerising the one or more monomers in and/or on the foam to form a polymer;
c) removing the foam to produce the particulate material, said particulate material comprising the polymer; and
d) reacting the polymer so as to introduce catalytic groups onto the surface of the particles of the particulate material.

In another embodiment there is provided a process for making a particulate material comprising porous polymeric microparticles, said process comprising:
a) impregnating microparticulate mesocellular siliceous foam with a liquid comprising at least two monomers;
b) polymerising the at least two monomers in and/or on the foam to form a polymer;
c) removing the foam to produce the particulate material, said particulate material comprising the polymer; and
d) reacting the polymer so as to introduce catalytic groups onto the surface of the particles of the particulate material;
wherein at least one of the monomers is a crosslinking monomer and at least one of the monomers comprises a functional group capable of being converted into a catalytic group.

The invention also provides a particulate material when made by the process of the invention.

In a third aspect of the invention there is provided a method for converting a starting material to a product comprising exposing said starting material to a particulate material according to the invention. In this aspect, the microparticles of the particulate material have catalytic functional groups on the surface thereof, said functional groups being capable of catalysing conversion of the starting material to the product.

The invention also provides a product made from a starting material according to the third aspect. It also provides the use of a particulate material according to the invention for converting a starting material to a product, wherein the particles of said material have catalytic functional group on the surface. It further provides a particulate material according to the invention when used for converting a starting material to a product, wherein the particles of said material have catalytic functional group on the surface.

DETAILED DESCRIPTION OF THE INVENTION

The present invention relates to mesoporous polymer particles (e.g. polymer colloids) and their application as supported asymmetric organocatalysts. Thus the invention provides a particulate material comprising porous polymeric microparticles having a mesoporous structure.

The polymeric microparticles may comprise a crosslinked polymer. The crosslinked polymer may comprise crosslinking monomer units and non-crosslinking monomer units. There may be one type of crosslinking monomer unit, or may be more than one, e.g. 2, 3, 4, 5 or more than 5 types of crosslinking monomer units. These may be isomers of each other, or may be chemically distinct types of monomer unit. There may be one type of non-crosslinking monomer unit, or may be more than one, e.g. 2, 3, 4, 5 or more than 5 types of non-crosslinking monomer units. These may be isomers of each other, or may be chemically distinct types of monomer. The ratio of crosslinking monomer units to non-crosslinking monomer units may be at least about 1:4 on a weight basis or a mole basis. The ratio may be at least about 1:3.5, 1:3, 1:2.5, 1:2, 1:1.5, 1:1.4, 1:1.3, 1:1.2, 1:1.1, 1:1, 1.1:1, 1.2:1, 1.3:1, 1.4:1, 1.5:1 or 2:1, or may be between about 1:4 and about 4:1, or between about 1:4 and 1:1, 1:4 and 1:2, 1:1 and 1:4, 1:2 and 1:4, 1:3 and 3:1 1:2 and 2:1, 1:2 and 1:1, 1:2 and 1:1.5, 1:1.5 and 1:1, 1:1 and 2:1, 1:1 and 1:1.5 or 1:1.5 and 1:2. The ratio may be for example about 1:4, 1:3.5, 1:3, 1:2.5, 1:2, 1:1.5, 1:1.4, 1:1.3, 1:1.2, 1:1.1, 1:1, 1.1:1, 1.2:1, 1.3:1, 1.4:1, 1.5:1, 2:1, 2.5:1, 3:1, 3.5:1 or 4:1 on a weight basis or a mole basis. Alternatively there may be no non-crosslinking monomer units.

At least one type of the crosslinking monomer units may be derived from divinyl benzene. The divinyl benzene may be the o-, m- or p-isomer. It may be a mixture of any two or more of these. Other crosslinking monomer units that may be present include those derived from ethylene glycol dimethacrylate (optionally substituted on the methacrylate methyl group), ethylene glycol diacrylate, other diacrylates or dimethacrylates (optionally substituted on the methacrylate methyl group) etc. At least one type of the non-crosslinked monomer units may be derived from styrene or a derivative thereof. Other non-crosslinking monomer units that may be present include those derived from acrylic acid, acrylates (e.g. methyl acrylate, ethyl acrylate, phenyl acrylate), methacrylic acid, methacrylates (e.g. methyl methacrylate, ethyl methacrylate, phenyl methacrylate), acrylamide, methacrylamide, maleic acid, fumaric acid, maleic anhydride, maleimide vinyl esters such as vinyl acetate, vinyl ethers such as methyl vinyl ether, or other polymerisable mono-olefinic species.

The polymer of the particulate material may comprise at least one monomer unit having a functional group. It may for example comprise between 1 and 5 monomer units having a functional group. It may have 1, 2, 3, 4, 5 or more than 5 monomer units having a functional group. The functional group may be a catalytic group. It may be a functional group capable of being converted into a catalytic group. It may be a biocatalyst, e.g. an enzyme, or some other biomolecule fragment, e.g. a saccharide, a peptide, a protein, an antibody fragment etc. It may be a functional group capable of attaching a biomolecule or biocatalyst. The catalytic group may be, or may comprise, a pyrrolidine group. The functional group capable of being converted into a catalytic group may be, or may comprise, a chloride group, a chloromethyl group or a carboxylic acid group. The monomer unit having the functional group may be a non-crosslinking monomer unit. The monomer unit having the functional group may be a crosslinking monomer unit. The polymer may comprise both crosslinking monomer units which have a functional group and non-crosslinking monomer units which have a functional group. In that case, the functional groups may either be the same or they may be different. The catalytic group may be an asymmetric catalytic group. It may be a chiral catalytic group. It may be a catalytic group capable of enantiospecific catalysis. It may be a catalytic group capable of stereospecific catalysis.

The mesoporous structure may have a bimodal distribution of pore sizes. It may have a structure comprising larger diameter pores connected by smaller diameter windows. The particulate material may have pores sizes (mean pore diameter) between about 1 and about 10 nm and pore sizes (mean pore diameter) between about 10 and about 30 nm. Thus the larger diameter pores may have a mean diameter between about 10 and 30 nm. The larger sized diameter may have a mean diameter of between about 10 and 20, and 15, 15 and 30, 20 and 30 or 15 and 25, e.g. about 10, 11, 12, 13, 14, 15, 16, 17, 18, 19, 20, 21, 22, 23, 24, 25, 26, 27, 28, 29 or 30 nm, or may have a mean diameter of greater than 30 nm (e.g. 30-50, 30-40 or 40-50 nm, or about 35, 40, 45 or 50 nm). The smaller diameter windows may have a mean diameter between about 1 and 10 nm. They may have a mean diameter of between about 1 and 5, 5 and 10 or 2 and 7 nm, e.g. about 1, 2, 3, 4, 5, 6, 7, 8, 9 or 10 nm. The ratio of the mean diameter of the larger diameter pores to the mean diameter of the smaller diameter windows may be between about 2:1 and about 20:1, or between about 2:1 and 10:1, 2:1 and 5:1, 5:1 and 20:1, 10:1 and 20:1, 5:1 and 15:1 or 5:1 and 10:1, e.g. about 2:1, 3:1, 4:1, 5:1, 6:1, 7:1, 8:1, 9:1, 10:1, 11:1, 12:1, 13:1, 14:1, 15:1, 16:1, 17:1, 18:1, 19:1 or 20:1. The pore size distribution may be measured by nitrogen absorption or by some other suitable method. The particulate material may have a BET surface area of between about 100 and about 1000 $m^2/g$, or between about 100 and 800, 100 and 600, 100 and 550, 100 and 500, 100 and 400, 100 and 300, 200 and 1000, 500 and 1000, 600 and 1000, 200 and 800, 200 and 600 or 200 and 550 $m^2/g$, e.g. about 100, 150, 200, 250, 300, 350, 400, 450, 500, 550, 600, 700, 800, 900 or 1000 $m^2/g$. It may have a pore volume of between about 0.1 and about 1 ml/g, or between about 0.1 and 0.8, 0.1 and 0.5, 0.2 and 1, 0.2 and 0.5, 0.5 and 1 or 0.2 and 0.4 ml/g, e.g. about 0.1, 0.15, 0.2, 0.25, 0.3, 0.35, 0.4, 0.45, 0.5, 0.55, 0.6, 0.65, 0.7, 0.75, 0.8, 0.85, 0.9, 0.95 or 1 ml/g. The particles of the particulate material may have a mean particle diameter of between about 1 and about 50 microns, or between about 5 and 50, 20 and 50, 10 and 50, 2 and 40, 1 and 10, 1 and 5, 1 and 2, 2 and 20, 2 and 10, 3 and 8, 4 and 7, 4 and 6, 5 and 20, 10 and 20, 2 and 10 or 5 and 10 microns, and may have a mean particle diameter of about 1, 2, 3, 4, 5, 6, 7, 8, 9, 10, 11, 12, 13, 14, 15, 16, 17, 18, 19, 20, 25, 30, 35, 40, 45 or 50 microns, or may be less than 1 micron or greater than 50 microns. The particles may have a narrow particle size distribution. There may be less than about 50% of particles having a particle size more than 10% different from (greater than or less than) the mean particle size, or there may be less than about 45, 40, 35, 30, 25, 20, 15, 10 or 5% of particles having a particle size more than 10% different from the mean particle size, and may be about 1, 2, 3, 4, 5, 10, 15, 20, 25, 30, 35, 40, 45 or 50% of particles having a particle size more than 10% different from the mean particle size. The particles may be spherical, or they may be some other shape, such as ovoid, ellipsoid, cubic, rhomboidal, prismatic, polyhedral or parallelepiped (for example rectangular parallelepiped).

The particulate material may comprise less than about 5% inorganic material on a weight basis. It may contain less than about 5% silica. It may comprise less than about 4, 3, 2 or 1% silica. It may comprise between about 0 and about 5% inorganic material (e.g. silica) or between about 0 and 4, 0 and 3, 0 and 2, 0 and 1, 0.1 and 5, 0.1 and 2, 0.1 and 1 or 0.5 and 2% inorganic material (e.g. silica). It may contain 0, 0.1, 0.2, 0.3, 0.4, 0.5, 0.6, 0.7, 0.8, 0.9, 1, 1.5, 2, 2.5, 3, 3.5, 4, 4.5 or 5% inorganic material (e.g. silica) It may swell less than 1% at 20° C. in common organic solvents. It may swell less than about 0.5, 0.2 or 0.1%, or between about 0 and about 1, or between about 0 and 0.5, 0 and 0.2 or 0 and 0.1% in common organic solvents. Suitable solvents for testing swelling may be selected, for example, from methanol, ethanol, isopropanol, toluene, acetone, diethyl ether, methyl ethyl ketone, chloroform, carbon tetrachloride, water etc.

The present invention also provides a process for making the particulate material. The process comprises impregnating a porous microparticulate template material with a liquid comprising one or more monomers. The monomer(s) are then polymerised in and/or on the template material to form a polymer. The template material is then removed to produce the microparticulate material, said microparticulate material comprising the polymer.

The microparticulate template material may be inorganic. It may comprise silica or some other metal oxide (e.g. alumina, titania, zirconia) or a mixture of these, or a mixed oxide of any two or more of silicon, aluminium, titanium and zirconium. It may be for example mesocellular siliceous foam. The synthesis of mesocellular siliceous foam is described in PCT/SG2005/000194 and Han, Y., Lee, S. S., Ying, J. Y. Chem. Mater. 2006, 18, 643, the contents of which are incorporated herein by reference. The microparticulate template material may be hydrophilic. It may have silanol groups on the surfaces of the pores thereof. It may be hydrophobic. It may have hydrophobic groups on the pore surfaces thereof. Suitable hydrophobic groups may for example include trimethylsilyl, triphenylsilyl, triethylsilyl, diphenylsilanediyl, dimethylsilanediyl and diethylsilanediyl. Use of a hydrophobic template may improve compatibility of the template and/ or of the particulate material with organic solvents, particularly non-polar or only slightly polar solvents. However the results achieved in the present specification may be also achieved using a hydrophilic template material. If a hydrophobic template material is used, the process may include the step of hydrophobing a hydrophilic templating material (as described herein) to generate the hydrophobic template material. The hydrophobing may comprise reacting the hydrophilic template material with a hydrophobing reagent. Suitable hydrophobing reagents, and conditions for using them, are well known. The reagents include hexamethyldisiloxane, hexamethyldisilazane, trimethylsilyl halides (particularly chloride), dimethyldihalosilane (e.g. dimethyldichlorosilane) and equivalent ethyl, phenyl or other substituted reagents.

The template material may have a structure comprising cells (i.e. larger pores) connected by windows (i.e. smaller pores), wherein the cells have a larger mean diameter than the windows. The mean diameter of the cells of the template material may be greater than about 5 nm, or greater than about 10 nm. It may be between about 5 and about 100 nm or between about 5 and 50, 5 and 20, 10 and 100, 50 and 100, 20 and 30, 20 and 25, 2 and 22, 25 and 30, 27 and 30, 27 and 29, or 10 and 50 nm. The pore size may be about 5, 10, 15, 20, 21, 22, 23, 24, 25, 26, 27, 28, 29, 30, 35, 40, 45, 50, 55, 60, 65, 70, 75, 80, 85, 90, 95 or 100 nm. The particles of the template material may have a distribution of different pore sizes. The different pore sizes may be between about 5 and about 100 nm.

The particles of the template material may have a mean particle diameter of between about 1 and about 50 microns, or between about 2 and about 50, 20 and 50, 10 and 50, 2 and 40, 1 and 10, 1 and 5, 1 and 2, 2 and 20, 2 and 10, 3 and 8, 4 and 7, 4 and 6, 5 and 20, 10 and 20, 2 and 10 or 5 and 10 microns, and may have a mean particle diameter of about 1, 2, 3, 4, 5, 6, 7, 8, 9, 10, 11, 12, 13, 14, 15, 16, 17, 18, 19, 20, 25, 30, 35, 40, 45 or 50 microns, or may be less than 1 micron or greater than 50 microns. The particles of the template material may have a narrow particle size distribution. There may be less than about 50% of particles having a particle size more than 10% different from (greater than or less than) the mean particle size, or there may be less than about 45, 40, 35, 30, 25, 20, 15, 10 or 5% of particles having a particle size more than 10% different from the mean particle size, and may be about 1, 2, 3, 4, 5, 10, 15, 20, 25, 30, 35, 40, 45 or 50% of particles having a particle size more than 10% different from the mean particle size. The particles of the template material may be spherical, or they may be some other shape, such as ovoid, ellipsoid, cubic, rhomboidal, prismatic, or parallelepiped (for example rectangular parallelepiped). The ratio of the size of the cells in the template material and the size of the windows in the template material may be between about 10:1 and about 1.5:1, or between about 10:1 and 2:1, 10:1 and 5:1, 5:1 and 1.5:1, 3:1 and 1.5:1, 5:1 and 3:1 or 8:1 and 4:1, and may be about 10:1, 9:1, 8:1, 7:1, 6:1, 5:1, 4.5:1, 4:1, 3.5:1, 3:1, 2.5:1, 2:1 or 1.5:1, or may be some other ratio. The mean diameter of the windows of the template material may be greater than about 1 nm, greater than 2 nm, or greater than about 5 nm. It may be between about 1 and 25, 1 and 20, 1 and 10, 1 and 5, 5 and 20, 10 and 20, 5 and 15, 15 and 20 or 5 and 10 nm. The mean diameter of the windows may be about 1, 2, 3, 4, 5, 6, 7, 8, 9, 10, 11, 12, 13, 14, 15, 16, 17, 18, 19, 20, 21, 22, 23, 24 or 25 nm.

The particles of the template material may have a pore volume of between about 0.5 and about 5 cm$^3$/g, or between about 0.5 and 4, 0.5 and 3, 0.5 and 2, 1 and 5, 2 and 5, 3 and 5, 1 and 3, 1 and 2, 2 and 3, 1.5 and 2, 1.5 and 1.7, 2 and 2.5, 2.2 and 2.4 or 2 and 2.4, and may have a pore volume about 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.5, 4, 4.5 or 5 cm$^3$/g, or more than about 5 cm$^3$/g. The particles may gave a specific surface area of between about 100 and about 1000 m$^2$/g, or between about 100 and 500, 100 and 200, 200 and 1000, 500 and 1000, 200 and 800, 200 and 500, 500 and 800, 500 and 700, 500 and 600, 550 and 600, 550 and 570, 600 and 800, 650 and 750, 670 and 730 or 690 and 710 m$^2$/g, and may have a specific surface area of about 100, 150, 200, 250, 300, 350, 400, 450, 500, 510, 520, 530, 540, 550, 560, 570, 580, 590, 600, 610, 620, 630, 640, 650, 660, 670, 680, 690, 700, 710, 720, 730, 750, 750, 800, 850, 900, 950 or 1000 m$^2$/g, or may have a specific surface area of less than about 100 or greater than about 1000 m$^2$/g.

The process of the present invention may comprise the step of preparing the template material.

Prior to use, the template material may be degassed. This may for example comprise heating it to a temperature of at least about 80° C., or at least about 100, 150, 200, 250, 300, 350, 400, 450 or 500° C., or 80 to 500, 80 to 400, 80 to 300, 80 to 200, 80 to 150, 80 to 120, 100 to 500, 200 to 500, 300 to 500, 100 to 400 or 100 to 200° C., e.g. at about 80, 90, 100, 110, 120, 130, 140, 150, 200, 250, 300, 350, 400, 450 or 500° C. The degassing may be under vacuum. The vacuum may have an absolute pressure of less than about 100 mbar, or less than about 50, 20, 10, 5, 2 or 1 mBar, or about 0.1 to 100, 0.1 to 50, 0.1 to 10, 0.1 to 5, 0.1 to 1, 0.1 to 0.5, 1 to 100, 5 to 100, 10 to 100, 50 to 100, 1 to 50 or 1 to 10 mbar, e.g. about 0.1, 0.2, 0.3, 0.4, 0.5, 0.6, 0.7, 0.8, 0.9, 1, 2, 3, 4, 5, 6, 7, 8, 9, 10, 15, 20, 25, 30, 35, 40, 45, 50, 60, 70, 80, 90 or 100 mbar. The degassing may be for at least about 1 hour, or at least about 2, 6, 12, 18 or 24 hours, or for about 1 to 24, 6 to 24, 12 to 24, 1 to 18, 1 to 12, 1 to 6, 6 to 18, 6 to 12 or 12 to 18 hours, e.g. about 1, 2, 3, 4, 5, 6, 9, 12, 15, 18, 21 or 24 hours. The step of degassing the template material may at least partially dry the template material.

The liquid which is infused into the template material may comprise a solvent. The solvent may be a solvent for the monomer or monomers. It may be a solvent for an initiator, if present. It may be non-polymerisable. The solvent (if present) may be present in the liquid at a level of between about 50 and about 90% on a weight or volume basis, or at about 50 to 70, 70 to 90, 60 to 80 or 60 to 70%, e.g. about 50, 55, 60, 65, 70, 75, 80, 85 or 90% on a weight or volume basis. Alternatively the liquid may not comprise a non-polymerisable solvent. Suitable solvents which may be used include common organic solvents such as dichloromethane (DCM), chloroform, carbon tetrachloride, trichloroethane, toluene, acetone, diethyl ether etc. The solvent, if present, preferably is such that it does not inhibit polymerisation of the monomer(s).

The liquid which is infused into the template comprises one or more polymerisable monomers. The total concentration of monomer(s) in the liquid may be between about 10 and 100% on a weight or volume basis, or between about 10 and 50, 10 and 30, 30 and 50 or 50 and 100%, e.g. about 10, 15, 20, 25, 30, 35, 40, 45, 50, 55, 60, 65, 70, 75, 80, 85, 90, 95 or 100% on a weight or volume basis.

The liquid which is infused into the template material may comprise a crosslinking monomer. It may comprise a non-crosslinking monomer. It may comprise both a crosslinking monomer and a non-crosslinking monomer. It may comprise no non-crosslinking monomer. There may be one type of crosslinking monomer, or may be more than one, e.g. 2, 3, 4, 5 or more than 5 types of crosslinking monomer. These may be isomers of each other, or may be chemically distinct types of monomer. There may be one type of non-crosslinking monomer, or may be more than one, e.g. 2, 3, 4, 5 or more than 5 types of non-crosslinking monomer. These may be isomers of each other, or may be chemically distinct types of monomer. The ratio of crosslinking monomer to non-crosslinking monomer may be at least about 1:4 on a weight basis, a volume basis or a mole basis. The ratio may be at least about 1:3.5, 1:3, 1:2.5, 1:2, 1:1.5, 1:1.4, 1:1.3, 1:1.2, 1:1.1, 1:1, 1.1:1, 1.2:1, 1.3:1, 1.4:1, 1.5:1 or 2:1, or may be between about 1:4 and about 4:1, or between about 1:4 and 1:1, 1:4 and 1:2, 1:1 and 1:4, 1:2 and 1:4, 1:3 and 3:1 1:2 and 2:1, 1:2 and 1:1, 1:2 and 1:1.5, 1:1.5 and 1:1, 1:1 and 2:1, 1:1 and 1:1.5 or 1:1.5 and 1:2. The ratio may be for example about 1:4, 1:3.5, 1:3, 1:2.5, 1:2, 1:1.5, 1:1.4, 1:1.3, 1:1.2, 1:1.1, 1:1, 1.1:1, 1.2:1, 1.3:1, 1.4:1, 1.5:1, 2:1, 2.5:1, 3:1, 3.5:1 or 4:1 on a weight basis, a volume basis or a mole basis.

At least one type of the crosslinked monomer may be divinyl benzene. The divinyl benzene may be the o-, m- or p-isomer. It may be a mixture of any two or more of these. Other crosslinking monomers that may be used include ethylene glycol dimethacrylate (optionally substituted on the methacrylate methyl group), ethylene glycol diacrylate, other diacrylates or dimethacrylates (optionally substituted on the methacrylate methyl group) etc. At least one type of non-crosslinking monomer may be styrene or a derivative thereof. Other non-crosslinking monomers that may be used include acrylic acid, acrylates (e.g. methyl acrylate, ethyl acrylate, phenyl acrylate), methacrylic acid, methacrylates (e.g. methyl methacrylate, ethyl methacrylate, phenyl methacrylate), acrylamide, methacrylamide, maleic acid, fumaric acid, maleic anhydride, maleimide, vinyl esters such as vinyl acetate, vinyl ethers such as methyl vinyl ether, or other polymerisable mono-olefins.

The liquid may comprise at least one monomer having a functional group. It may for example comprise between 1 and 5 monomers having functional groups. It may have 1, 2, 3, 4, 5 or more than 5 monomers having functional groups. The functional group(s) may be a catalytic group(s). It may be a functional group capable of being converted into a catalytic group. It may be a biocatalyst, e.g. an enzyme, or some other biomolecule fragment, e.g. a saccharide, a peptide, a protein, an antibody fragment etc. It may be a functional group capable of attaching a biomolecule or biocatalyst. The catalytic group may be, or may comprise, a pyrrolidine group. The functional group capable of being converted into a catalytic group may be, or may comprise, a chloride group, a chloromethyl group or a carboxylic acid group. The monomer having the functional group may be a non-crosslinking monomer. The monomer unit having the functional group may be a crosslinking monomer. The liquid may comprise both crosslinking monomers which have a functional group and non-crosslinking monomers which have a functional group. In that case, the functional groups may either be the same or they may be different.

The liquid may also comprise an initiator for polymerisation of the monomer, or for copolymerisation of the monomers. The initiator may be a thermal initiator. It may be an azo compound, an azodicarboxylate, a peroxide, a hydroperoxide, a peroxyester or some other type of thermal initiator. The initiator may have a half life of between about 10 minutes and 20 hours at the temperature at which the polymerisation is conducted. It may have a half life at that temperature of about 10 minutes to 10 hours, 10 minutes to 2 hours, 10 minutes to 1 hour, 10 to 30 minutes, 0.5 to 20 hours, 1 to 20 hours, 2 to 20 hours, 10 to 20 hours, 1 to 10 hours or 1 to 5 hours, e.g. about 10, 20, 30, 40 or 50 minutes, or about 1, 2, 3, 4, 5, 6, 7, 8, 9, 10, 15 or 20 hours. It may have a 10 hour half life temperature between about 50 and about 150° C., or between about 50 and 100, 100 and 150, 50 and 70, 70 and 100, 100 and 120, 120 and 150 or 80 and 120° C., e.g. about 50, 60, 70, 80, 90, 100, 110, 120, 130, 140 or 150° C. Suitable initiators include azobisisobutyronitrile (AIBN), dibenzoyl peroxide, cumyl hydroperoxide, t-butyl perbenzoate etc. The initiator may be present in the liquid at a concentration of between about 0.5 and 5% w/w or w/v, is or at about 0.5 and 2, 0.5 and 1, 1 and 5, 2 and 5 or 1 and 3%, e.g. about 0.5, 1, 1.5, 2, 2.5, 3, 3.5, 4, 4.5 or 5% w/w or w/v. It may be present at between about 1 and about 5% on a mole basis relative to polymerisable groups in the liquid, or at about 1 to 4, 1 to 3, 1 to 2, 2 to 5, 3 to 4 or 2 to 4%, e.g. about 1, 1.5, 2, 2.5, 3, 3.5, 4, 4.5 or 5% on a mole basis relative to polymerisable groups in the liquid.

The step of impregnating the template material with the liquid may comprise contacting the template material with the liquid. It may comprise adding the liquid to the template material. It may comprise adding the liquid to the template material. It may comprise passing the liquid through the template material. It may comprise suspending the template material in the liquid. The ratio of liquid to template material during the step of impregnating may be between about 1:1 and about 5:1 on a w/w (e.g. g/g) or v/w (e.g. ml/g) basis. It may be about 1:1 to 4:1, 1:1 to 3:1, 1:1 to 2:1, 2:1 to 5:1, 3:1 to 5:1, 2:1 to 4:1 or 2:1 to 3:1, e.g. about 1:1, 1.5:1, 2:1, 2.1:1, 2.2:1, 2.3:1, 2.4:1, 2.5:1, 3:1, 3.5:1, 4:1, 4.5:1 or 5:1, or may be more than 5:1. The ratio of liquid to template material during the step of impregnating may be such that the ratio of monomer (i.e. crosslinking monomer plus non-crosslinking monomer) to template material is between about 0.5 and about 5 ml monomer per gram of template material, or about 0.5 to 2, 0.5 to 1, 1 to 5, 2 to 5, 1 to 3, 1 to 2 or 1 to 1.5 ml per gram of template material, for example about 0.5, 0.6, 0.7, 0.8, 0.9, 1, 1.1, 1.2, 1.3, 1.4, 1.5, 1.6, 1.7, 1.8, 1.9, 2, 2.5, 3, 3.5, 4, 4.5 or 5 ml per gram of template material. The step of impregnating the template material with the liquid may comprise exposing the template to the liquid for between about 0.5 and about 30 minutes, or between about 1 and 30, 5 and 30, 10 and 30, 0.5 and 10, 0.5 and 5, 0.5 and 2 or 0.5 and 1 minutes. It may be for about 0.5, 0.6, 0.7, 0.8, 0.9, 1, 1.5, 2, 2.5, 3, 3.5, 4, 4.5, 5, 6, 7, 8, 9, 10, 15, 20, 25 or 30 minutes. It may be for more than 30 minutes. It may be for less than 30 seconds, e.g. 25, 20, 15, 10 or 5 seconds. The step of impregnating may be conducted between about 0 and about 25° C., or between about 0 and 20, 0 and 15, 0 and 10, 5 and 25, 15 and 25 or 15 and 20° C., e.g. about 0, 5, 10, 15, 20 or 25° C. It may be conducted at room temperature. It should be conducted at a temperature at which there is no significant degree of polymerisation of the monomer(s) in the liquid over the time required for the impregnation. Excess of the liquid may be removed following the impregnation. Following the impregnation, the solvent (if present) may be removed. This may comprise exposing the template having the liquid therein to a vacuum at low temperature. The temperature should be sufficiently high as to evaporate the solvent, and sufficiently low to not remove the monomer(s). The temperature may be between about −50 and about −100° C. It may be between about −50 and −80, −60 and −100, −70 and −100, −70 and −90 or −75 and −85° C., e.g. about −100, −95, −90, −85, −80, −78, −75, −70, −65, −60, −55 or −50° C. The time of exposure to the vacuum at low temperature should be sufficiently long as to evaporate the solvent, and sufficiently short to not remove the monomer(s) or sufficiently short not to remove substantial amounts (e.g. more than about 5, 4, 3, 2 or 1%) of the monomer(s). It may be between about 1 and about 10 hours, or between about 1 and 5, 1 and 2, 2 and 10, 5 and 10, 2 and 5 or 3 and 5 hours, e.g. about 1, 2, 3, 4, 5, 6, 7, 8, 9 or 10 hours.

If the liquid contains a thermal initiator, step b) of the process comprises heating the liquid in and/or on the template material so as to polymerise the monomer(s). It may comprise heating the liquid to a temperature and for sufficient time to polymerise the monomer(s). It may comprise heating the liquid to a temperature and for sufficient time to cause sufficient decomposition of the initiator to polymerise the monomer(s). The heating may be at a temperature of between about 10 minutes and 20 hours, or about 10 minutes to 10 hours, 10 minutes to 2 hours, 10 minutes to 1 hour, 10 to 30 minutes, 0.5 to 20 hours, 1 to 20 hours, 2 to 20 hours, 10 to 20 hours, 1 to 10 hours or 1 to 5 hours, e.g. about 10, 20, 30, 40 or 50 minutes, or about 1, 2, 3, 4, 5, 6, 7, 8, 9, 10, 15 or 20 hours. It may be heated to a temperature between about 50 and about 150° C., or between about 50 and 100, 100 and 150, 50 and 70, 70 and 100, 100 and 120, 120 and 150 or 80 and 120° C., e.g. about 50, 60, 70, 80, 90, 100, 110, 120, 130, 140 or 150° C. The temperature may be about the 10 hour half-life temperature of the initiator, or about the 5, 4, 3, 2 or 1 hour half-life temperature of the initiator, or the 30, 20, 10 or 5 minute half-life temperature of the initiator. The heating may be in a single stage. It may be in multiple stages, e.g. 2, 3, 4, 5, 6, 7, 8, 9 or 10 stages. Each stage may be at a temperature and for a time as described above. If multiple stages are used, each subsequent stage may be at a higher temperature than the preceding stage.

Step b) of the process may comprise polymerising the monomer(s) to a conversion of at least about 80%, or at least about 85, 90 or 95%, or between about 80 and 100, 50 and 100, 90 and 100, 95 and 100, 98 and 100, 80 and 95 or 85 and 95%, e.g. about 80, 85, to 90, 95, 96, 97, 98, 99 or 100%. The conditions (temperature, time, deoxygenation etc.) may be sufficient to achieve this degree of conversion.

The conversion results in production of a microparticulate material. Following the polymerisation the particulate material may be washed. The washing may be for the purpose of removing unreacted monomer, surfactant, initiator, initiator byproducts or other low molecular weight or uncrosslinked material. The washing may use a solvent, commonly an organic solvent. The solvent may be a volatile solvent. Suitable solvents include methanol, ethanol, isopropanol, chloroform, dichloromethane, acetone, butanone, toluene, dioxane or other common solvents, or mixtures of these. Several washing steps may be conducted, and these may use the same solvents, or may use different solvents. The material may be dried following the washing. The drying may comprise heating the material. The heating may be at a sufficient temperature to evaporate the solvent used for washing. The temperature may depend on the nature (e.g. boiling point, vapour pressure) of the solvent. The temperature may be between about 50 and 150° C., e.g. 50 to 100, 50 to 80, 70 to 100, 100 to 150 or 70 to 120° C., e.g. about 50, 60, 70, 80, 90, 100, 110, 120, 130, 140 or 150° C. The drying may comprise applying a vacuum or partial vacuum to the material, at a pressure, for example of about 1 to about 100 mBar, or 1 to 50, 1 to 20, 1 to 10, 10 to 100, 20 to 100, 50 to 100 or 10 to 50 mBar, or some other pressure, e.g. about 1, 2, 3, 4, 5, 6, 7, 8, 9, 10, 15, 20, 25, 30, 35, 40, 45, 50, 60, 70, 80, 90 or 100 mBar. The drying may comprise passing a gas, e.g. air, nitrogen, carbon dioxide, through the material. The gas may be at ambient temperature. It may be at elevated temperature.

Step c) of the process may comprise dissolving the template material in a solvent which does not dissolve the polymer. The solvent should be a solvent for the template material and a non-solvent or a poor solvent for the polymer. In the case where the template comprises silica, a suitable solvent may be basic. It may be an alkaline hydroxide solution, e.g. sodium, potassium or caesium hydroxide solution. The solution may be an alcoholic solution (e.g. in methanol, ethanol or isopropanol). It may be a solution in an aqueous alcohol (e.g. in aqueous methanol, aqueous ethanol or aqueous isopropanol). The aqueous alcohol may be a mixture of water and the alcohol in a ratio of between about 2:1 and 1:2 on a volume basis, or 2:1 and 1:1, 1:1 and 1:2, 1:1.5 and 1.5:1, 1.2:1 and 1:1.2 or 1.1:1 and 1:1.1, e.g. about 2:1, 1.75:1, 1.5:1, 1.4:1, 1.3:1, 1.2:1, 1.1:1, 1:1, 1:1.1, 1:1.2, 1:1.3, 1:1.4, 1:1.5, 1:1.75 or 1:2. The concentration of the alkaline hydroxide may be between about 1 and about 10% w/v, or about 1 to 5, 1 to 2, 2 to 10, 5 to 10 or 2 to 5%, e.g. about 1, 2, 3, 4, 5, 6, 7, 8, 9 or 10% w/v. The dissolving may be conducted at a temperature and for a time suitable for dissolution of the template material. It may be at a temperature and for a time that does not cause significant dissolution of the polymer. Significant dissolution of polymer may be taken to be greater than about 10, 9, 8, 7, 6 or 5% of the polymer. The temperature of dissolving may be between about 50 and 150° C., e.g. 50 to 100, 50 to 80, 70 to 100, 100 to 150 or 70 to 120° C., e.g. about 50, 60, 70, 80, 90, 100, 110, 120, 130, 140 or 150° C. It may be for at least about 6 hours, or at least about 12, 18 or 24 hours, or between about 6 and about 24 hours, or about 6 to 18, 6 to 12, 12 to 24, 12 to 18 or 18 to 24 hours, e.g. about 6, 7, 8, 9, 10, 11, 12, 13, 14, 15, 16, 17, 18, 19, 20, 21, 22, 23 or 24 hours, or may be for more than 24 hours. The dissolving may dissolve at least about 95% of the template material, or at least about 96, 97, 98, 99 or 99.5% of the template material, or between about 95 and about 100%, or 96 to 100, 97 to 100, 98 to 100, 99 to 100 or 99.5 to 100% of the template material, e.g. about 95, 96, 97, 98, 99, 99.5, 99.6, 99.7, 99.8, 99.9 or 100% of the template material. The resulting microparticulate material may have a hydrocarbon content of at least about 96, 97, 98, 99 or 99.5% by weight, or between about 95 and about 100%, or 96 to 100, 97 to 100, 98 to 100, 99 to 100 or 99.5 to 100% by weight, e.g. about 95, 96, 97, 98, 99, 99.5, 99.6, 99.7, 99.8, 99.9 or 100% by weight.

The process may additionally comprise the step of reacting the polymer so as to introduce catalytic groups onto the surface of the particles of the microparticulate material. The reacting may comprise reacting the microparticulate material with a reagent containing the catalytic group. The reagent, and/or the catalytic group, may be asymmetric. It may be chiral. This step may comprise any of the well known methods of introducing chemical groups into a molecule or onto a functionalised solid. These include nucleophilic substitution of a benzyl halide (e.g. chloride or bromide) group, "click" chemistry etc. Suitable click chemistry may include for example cycloaddition reactions, such as the Huisgen 1,3-dipolar cycloaddition, Cu(I) catalyzed azide-acetylene cycloaddition, Diels-Alder reaction, nucleophilic substitution to small strained rings (e.g. epoxy and aziridine rings), formation of ureas and amides and addition reactions to double bonds, e.g. epoxidation, dihydroxylation.

In one example the catalytic group is a pyrrolidine group. A suitable method for introducing this group is by reaction of a benzyl halide group on the polymer (which may be introduced by means of a halomethyl styrene monomer) with a suitable pyrrolidine derivative, for example compound E below.

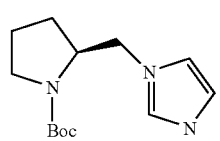

E

The pyrrolidine derivative may be an N-protected pyrrolidine derivative. It may be a nucleophilic N-protected pyrrolidine derivative.

This reaction may comprise suspending the microparticulate material (having halobenzyl groups) in a solvent. The solvent may be a solvent for the pyrrolidine derivative. It may be a non-swelling solvent for the polymer of the microparticulate material. It may be a swelling solvent for the polymer of the microparticulate material. It may be a polar solvent. It may be a dipolar aprotic solvent. It may be an ionic liquid. It may be for example dimethyl formamide (DMF), dimethyl sulfoxide (DMSO), N-methylpyrrolidone (NMP), hexamethyl phosphoric triamide or phosphoramide (HMPT, HMPA), propylene carbonate, or other suitable solvent. The mixture of the microparticulate material and the solvent may be a suspension. It may comprise about 1 and about 10% w/v of the microparticulate material, or between about 1 and 5, 1 and 2, 2 and 10, 5 and 10 or 2 and 5%, e.g. about 1, 2, 3, 4, 5, 6, 7, 8, 9 or 10% w/v. The pyrrolidine derivative may then be added to the mixture, at a ratio of between about 0.1 and about 10 mmol per gram of microparticulate material, or between about 0.1 and 5, 0.1 and 2, 0.1 and 1, 1 and 10 or 0.2 and 1 mmol/g, e.g. about 0.1, 0.2, 0.3, 0.4, 0.5, 0.6, 0.7, 0.8, 0.9, 1, 2, 3, 4, 5, 6, 7, 8, 9 or 10 mmol/g. It may be added at an amount of between about 0.8 and about 2 mol equivalents relative to halobenzyl groups on the microparticulate material, or about 0.8 to 1.5, 0.8 to 1.2, 1 to 2, 1 to 1.5 or 1 to 1.2 mol equivalents, e.g. about 0.8, 0.9, 1, 1.1, 1.2, 1.3, 1.4, 1.5, 1.6, 1.7, 1.8, 1.9 or 2 mol equivalents, or more than about 2 mole equivalents, e.g. about 3, 4, 5, 6, 7, 8, 9 or 10 mol equivalents. The mixture may then be allowed to react for sufficient time and at sufficient temperature for incorporation of pyrrolidine groups into the microparticulate material. The time may be between about 1 and about 48 hours, or between about 1 and 36, 1 and 24, 1 and 12, 6 and 48, 12 and 48, 24 and 48, 12 and 36 or 18 and 30 hours, e.g. about 1, 2, 3, 4, 5, 6, 9, 12, 15, 18, 21, 24, 27, 30, 33, 36, 39, 42, 45 or 48 hours. The temperature may be between about 50 and 150° C., e.g. 50 to 100, 50 to 80, 70 to 100, 100 to 150 or 70 to 120° C., e.g. about 50, 60, 70, 80, 90, 100, 110, 120, 130, 140 or 150° C. The temperature may be at or below the boiling point of the solvent. Following this reaction, the resulting derivatised microparticulate material may be separated, and then washed and dried. The separation may comprise settling and decanting, centrifuging, filtering etc. The washing and drying may be as described above for the microparticulate material. If the pyrrolidine derivative is an N-protected pyrrolidine derivative, the derivatised microparticulate material will be an N-protected material. In this case, the method may also include the step of deprotecting the N-protected material. In the case where the N-protecting group is Boc (t-butyloxycarbonyl), this may comprise reacting the N-protected material with trifluoroacetic acid (TFA). This may be achieved by exposing the N-protected material to TFA (optionally in an organic solvent such as dichloromethane) for sufficient time at sufficient temperature to deprotect the pyrrolidine groups. The temperature may be room temperature, or may be elevated temperature. The time may be between about 1 and about 48 hours, or between about 1 and 36, 1 and 24, 1 and 12, 6 and 48, 12 and 48, 24 and 48, 12 and 36 or 18 and 30 hours, e.g. about 1, 2, 3, 4, 5, 6, 9, 12, 15, 18, 21, 24, 27, 30, 33, 36, 39, 42, 45 or 48 hours. The resulting catalytic microparticulate material may be separated, and then washed and dried. The separation may comprise settling and decanting, centrifuging, filtering etc. The washing and drying may be as described above for the microparticulate material. Following this method, the catalytic microparticulate material may have a pyrrolidine loading of between about 0.1 and 1 mmol per gram of material, or between about 0.1 and 0.5, 0.1 and 0.2, 0.2 and 1, 0.5 and 1, 0.2 and 0.5 or 0.2 and 0.3, e.g. about 0.1, 0.15, 0.2, 0.25, 0.3, 0.35, 0.4, 0.45, 0.5, 0.55, 0.6, 0.65, 0.7, 0.75, 0.8, 0.85, 0.9, 0.95 or 1 mmol per gram of material.

The invention also provides a method for converting a starting material to a product comprising exposing said starting material to a particulate material according to the invention. In this method, the microparticles of the particulate material have catalytic functional groups on the surface thereof, said functional groups being capable of catalysing conversion of the starting material to the product. The catalytic groups may be as described previously herein. The microparticulate material may have a catalytic group loading of between about 0.1 and 1 mmol per gram of material, or between about 0.1 and 0.5, 0.1 and 0.2, 0.2 and 1, 0.5 and 1, 0.2 and 0.5 or 0.2 and 0.3, e.g. about 0.1, 0.15, 0.2, 0.25, 0.3, 0.35, 0.4, 0.45, 0.5, 0.55, 0.6, 0.65, 0.7, 0.75, 0.8, 0.85, 0.9, 0.95 or 1 mmol per gram of material. The reaction may be stereospecific. It may be enantiospecific.

In one example, the microparticulate material comprises pyrrolidine groups, and the method comprises conducting a Michael addition. The Michael addition may be of a carbonyl compound having an α-hydrogen atom to an activated olefin. The carbonyl compound may be for example a ketone, e.g. a cyclic ketone or a β-diketone. The olefin may be a styrene derivative, e.g. a styrene having an electron-withdrawing β-substituent. The Michael addition may be of cyclohexanone to β-nitrostyrene. The Michael addition may be acid catalysed. In an example, the microparticulate material comprising pyrrolidine groups is combined with an activated olefin at a mole ratio of pyrrolidine groups to carbonyl compound of between about 10 and 50% (or between about 10 and 40, and 30, 20 and 50, 30 and 50, 20 and 40 or 25 and 35, for example about 10, 15, 20, 25, 30, 35, 40, 45 or 50%). To the resultant mixture, a solution of an acid catalyst (e.g. is TFA, at between about 5 and about 20 mol %, e.g. about 5, 10, 15 or 20 mol %) in the carbonyl compound is added. The carbonyl compound may be in excess over the activated olefin, e.g. a molar excess of at least about 1.1, 1.5, 2, 10, 50, 100, 200, 300, 400 or 500 fold, or about 1.1, 1.2, 1.3, 1.4, 1.5, 2, 3, 4, 5, 10, 20, 30, 40, 50, 100, 150, 200, 250, 300, 350, 400, 450 or 500 fold. The reaction may be conducted at room temperature or some other convenient temperature. It may be conducted for sufficient time to achieve a suitable conversion (e.g. at least about 70, 80 or 90%) of the activated olefin. The reaction may be stereospecific, and may have a stereospecificity of at least about 50, 60, 70, 80 or 90%, or a stereospecificity of about 50, 55, 60, 65, 70, 75, 80, 85, 90, 95 or 100%. The reaction may be enantiospecific, and may have an enantiospecificity of at least about 50, 60, 70, 80 or 90%, or an enantiospecificity of about 50, 55, 60, 65, 70, 75, 80, 85, 90, 95 or 100%. The reaction may be diastereoselective, and may have an diastereoselectivity of at least about 50, 60, 70, 80 or 90%, or an diastereoselectivity of about 50, 55, 60, 65, 70, 75, 80, 85, 90, 95 or 100%. The reaction may take between about 1 and about 48 hours, or between about 1 and 36, 1 and 24, 1 and 12, 6 and 48, 12 and 48, 24 and 48, 12 and 36 or 18 and 30 hours, e.g. about 1, 2, 3, 4, 5, 6, 9, 12, 15, 18, 21, 24, 27, 30, 33, 36, 39, 42, 45 or 48 hours.

The microparticulate material may be reused for catalysing subsequent reactions. It may be reused 1, 2, 3, 4, 5, 6, 7, 8, 9, 10 or more than 10 times. It may display a loss of catalytic activity on each reuse of less than about 10%, or less than about 9, 8, 7, 6, 5, 4, 3, 2 or 1% (e.g. a loss of about 0, 0.1, 0.2, 0.3, 0.4, 0.5, 1, 1.5, 2, 2.5, 3, 3.5, 4, 4.5, 5, 6, 7, 8, 9 or 10%).

In this context the loss of activity may be considered to be the reduction in yield of the catalysed reaction when using the same amount of catalyst and of reagents (and other catalyst if present) under the same conditions of time and temperature. It may display a loss of enantiospecificity or of stereospecificity or of diastereoselectivity of less than about 10%, or less than about 9, 8, 7, 6, 5, 4, 3, 2 or 1% (e.g. a loss of about 0, 0.1, 0.2, 0.3, 0.4, 0.5, 1, 1.5, 2, 2.5, 3, 3.5, 4, 4.5, 5, 6, 7, 8, 9 or 10%).

A new type of material, low-swelling mesoporous polymer particles (MPPs), has been developed by using mesoporous silica particles as hard templates. This new material pa can be used as an effective support for catalytic complexes.

Various approaches have previously been developed for synthesizing porous polymers, such as solvent-controlled macroporous polymer, hard-templated mesoporous polymer, soft-templated mesoporous polymer, etc. However, deriving micron-sized polymer particles with interconnected mesopores of >10 nm has remained a challenge. The present inventors have found that siliceous mesocellular foam (MCF) may be successfully used as a hard template to generate MPPs. MCF is well known (Zhao, D., Feng, J., Huo, Q., Melosh, N., Fredrickson, G. H., Chmelka, B. F., Stucky, G. D. Science 1998, 279, 548; Schmidt-Winkel, P., Lukens, W. W., Jr., Zhao, D., Yang, P., Chmelka, B. F., Stucky, G. D. J. Am. Chem. Soc. 1999, 121, 254; Schmidt-Winkel, P., Lukens, W. W., Jr., Yang, P., Margolese, D. I., Lettow, J. S., Ying, J. Y., Stucky, G. D. Chem. Mater. 2000, 12, 686; Lettow, J. S., Han, Y. J., Schmidt-Winkel, P., Yang, P., Zhao, D., Stucky, G. D., Ying, J. Y. Langmuir 2000, 16, 8291; Lettow, J. S., Lancaster, T. M., Glinka, C. J., Ying, J. Y. Langmuir 2005, 21, 5738) and these references are incorporated herein by cross reference.

The MPPs described herein are novel in structure, and are derived by a new synthetic approach. Polymer-supported pyrrolidine via imidazolium linkage has also not been reported before. MPPs retain the excellent physical properties of the mesoporous silica template, without the challenges associated with surface silanol species. The surface property of MPP may be easily modified for a wide range of potential applications. Using a high crosslinker/monomer (i.e. crosslinking to non-crosslinking monomer) molar ratio (e.g. >1:2), the inventors have derived a polymer that was rigid and robust enough to retain a porous structure after removal of the silica template. The porosity of the MPP could be adjusted by using different amounts of monomer. The specific surface area may be varied from 100 m$^2$/g to 550 m$^2$/g or more. The surface properties of the MPPs may be controlled by using different functionalized monomers.

Various examples of the modification and use of MPPs are presented herein. MPPs may for example be modified with benzyl chloride and carboxyl groups. Pyrrolidine was successfully immobilized onto MPPs through imidazolium linkage. Catalytic Michael addition of cyclohexanone to nitrostyrene over MPP-supported pyrrolidine led to conjugated adducts with very high diastereoselectivity and enantioselectivity.

The MPPs described herein find application as catalyst supports, adsorbents/absorbents, packing materials for column chromatography, and as nanostructured carriers for drugs, proteins and/or genes.

BRIEF DESCRIPTION OF THE DRAWINGS

Preferred embodiments of the present invention will now be described, by way of an example only, with reference to the accompanying drawings wherein.

DETAILED DESCRIPTION OF THE PREFERRED EMBODIMENTS

Synthesis of MPP

In the examples presented herein, spherical MCF microparticles of 2-10 μm were used, as described previously (Han, Y., Lee, S. S., Ying, J. Y. Chem. Mater. 2006, 18, 643). The microparticles have a B.E.T. surface area of 504 m$^2$/g and a 3-dimensional, interconnected pore structure with ultralarge cell-like pores (30 nm) that are connected by windows of 18 nm.

Figure 1:
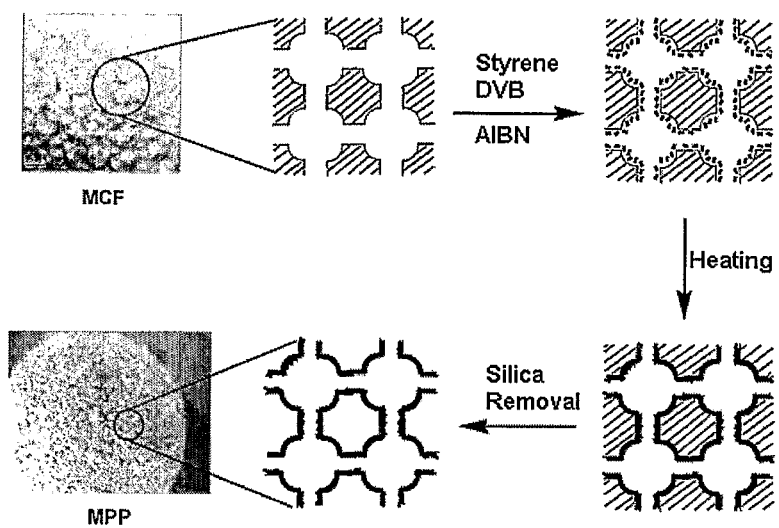
FIG. 1 is a scheme illustrating the synthesis of MPPs.

The MPPs were prepared as illustrated in FIG. 1. Thus styrene, divinylbenzene (DVB) crosslinker and α,α'-azobisisobutyronitrile (AIBN) were wet-impregnated onto MCF. A uniform polymer layer was formed on the MCF framework by direct polymerization of the monomers that adsorbed on the MCF pore walls. MPPs were obtained after removing the silica matrix. Photoacoustic Fourier-transform infrared (PA-FTIR) spectrum of MPPs showed the disappearance of silica bands in the range of 700-1300 cm$^{-1}$. Elemental analysis further confirmed that the silica template was completely removed.

Figure 5:
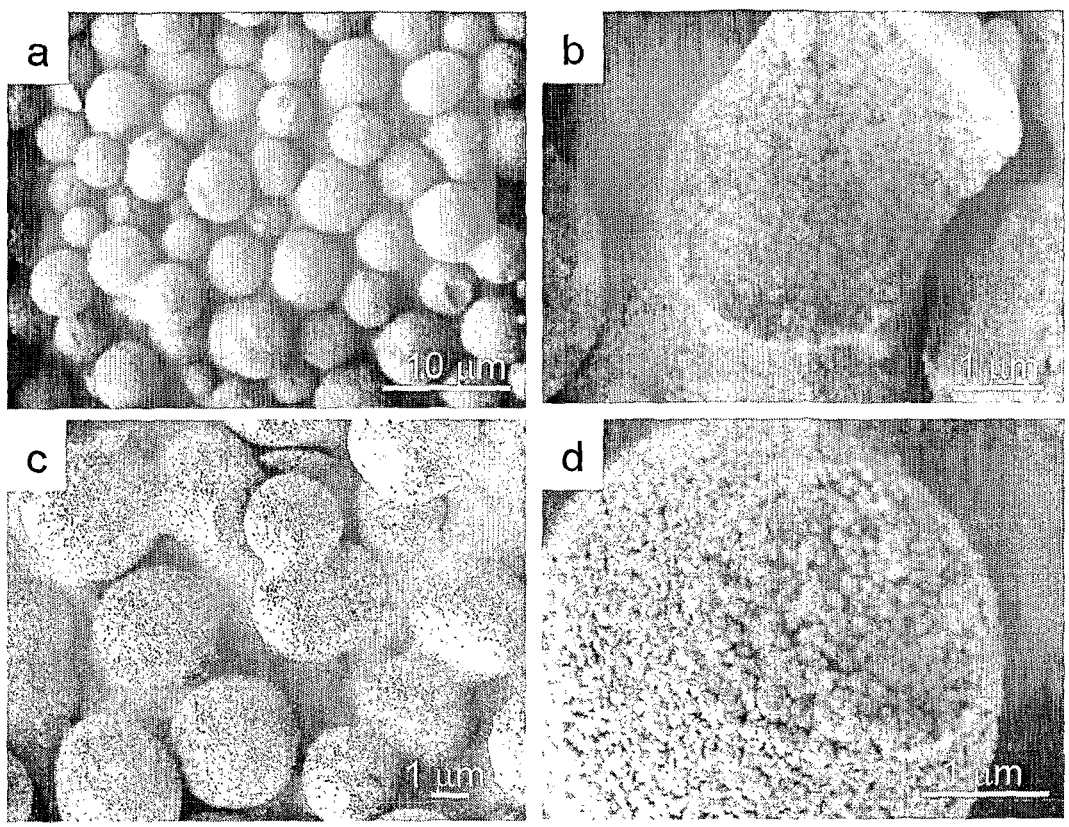
FIG. 5 shows SEM (scanning electron microscope) images of (a) spherical MCF microparticles and (b-d) MPPs.
Figure 6:
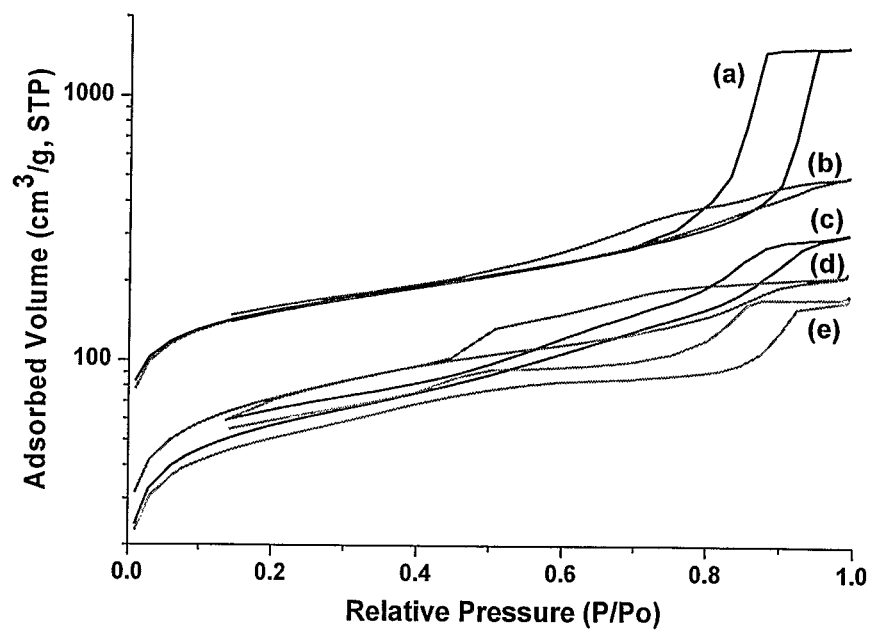
FIG. 6 shows $N_2$ adsorption-desorption isotherms of (a) MCF, (b) MPP-A, (c) MPP-COOH, (d) MPP-Cl, and (e) MPP-B.

The synthesis of robust MPPs required the use of a relatively high crosslinker/monomer molar ratio. Commonly a ratio of >1:2 was used, although a lower ratio may be used. The resulting polymer coating was highly crosslinked, and rigid and robust enough to retain the porous MCF framework after removing the silica template. The MPPs also possessed the same particle size and morphology of the hard template (see FIG. 5). The highly crosslinked polymer has little or no swelling in various solvents. This is an important property for catalytic applications. The MPPs successfully maintained the mesoporous structure after several reaction runs under different conditions. The diffusion limitation experienced by other polymer supports was not an issue with MPPs. The porosity of MPPs could be adjusted by using different amount of monomers. The surface areas of MPPs were controlled between 100 m$^2$/g and 550 m$^2$/g. Two sets of pores, 10-25 nm and 1-10 nm, were present in the $N_2$ sorption isotherms of MPPs (FIG. 6 and Table 1). The former was associated with the mesopores of the MCF template, and the latter was mainly derived from the removal of silica pore walls of the cast. The surface properties of MPPs could be modified by using different functionalized monomers. When 4-vinyl benzyl chloride was co-polymerized with DVB, the resulting MPPs (MPP-Cl in Table 1) had surface benzyl chloride groups, which could be easily converted to ammonium groups with positive charges. When acrylic acid was co-polymerized with DVB, the resulting MPPs (MPP-COOH in Table 1) had surface carboxyl groups. The ease with which the MPPs could be derived and the flexibility with which they could be modified in chemical and physical properties provided for a broad range of potential applications.

MPP-Supported Chiral 2-Imidazole Pyrrolidine

Figure 2:
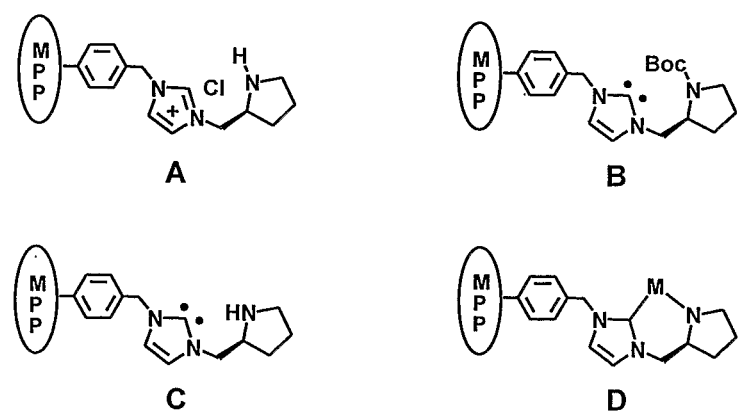
FIG. 2 shows the structures of some MPP-supported chiral pyrrolidine or NHC catalysts.

The present inventors have generated a versatile catalyst system by immobilizing pyrrolidine onto MPPs through imidazolium linkage. This system could be flexibly transformed into different type of catalysts, such as, chiral pyrrolidine organocatalyst (A), N-heterocyclic carbene (NHC) nucleophile catalyst with protected pyrrolidine as a chirality induction source (B), amine-NHC bifunctional organocatalyst (C), and bidentate ligands for organometallic catalysts (D) (see FIG. 2). The present application describes the MPP-supported chiral pyrrolidine and its catalytic application in asymmetric Michael addition to nitroolefins.

Figure 3:
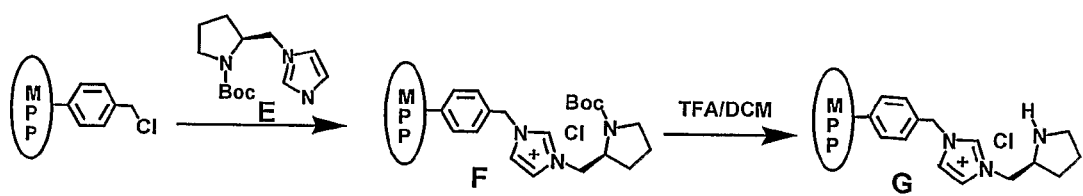
FIG. 3 is a scheme illustrating the synthesis of MPP-supported chiral pyrrolidine with imidazolium linkage.

Pyrrolidine organocatalyst was immobilized by direct alkylation of N-tert-butoxycarbonyl (Boc) protected pyrrolidine-substituted imidazole (E) (FIG. 3). MPP-Cl was mixed with E in DMF, and the reaction mixture was heated to 100° C. for 16 h. After filtration and washing, the solid was treated with trifluoroacetic acid (TFA) (50% in dichloromethane (DCM)) at room temperature for 16 h. After filtration, washing and drying in vacuum, MPP-supported chiral pyrrolidine with imidazolium linkage (G) was obtained. The loading of pyrrolidine was in the range of 0.1-0.5 mmol/g, depending on the different procedures used. Compared with MPP or MPP-Cl, G showed stronger PA-FTIR peaks for NH species (3300 $cm^{-1}$) and quaternary ammonium (1000-1200 $cm^{-1}$). This indicated that pyrrolidine groups were successfully immobilized onto MPPs, which was further confirmed by elemental analysis. It is thought that the straightforward synthesis and simple immobilization process will greatly facilitate the commercial is applications of this new system of materials.

Figure 4:
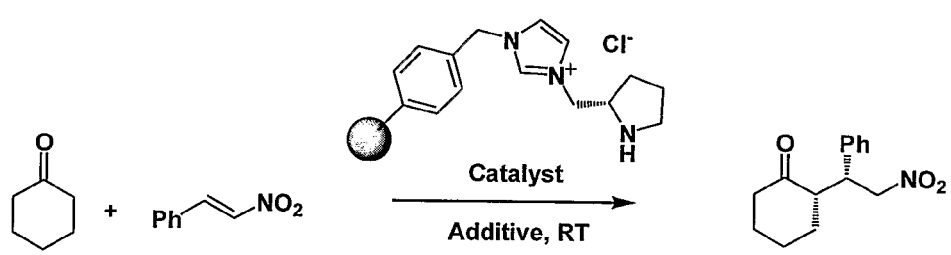
FIG. 4 is a scheme illustrating the catalytic Michael addition of cyclohexanone to nitrostyrene.

MPP-supported pyrrolidine was examined for the Michael addition to nitroolefin (FIG. 4). Table 2 shows that the catalytic Michael addition of cyclohexanone to nitrostyrene generally offered the conjugated adduct with very high diastereoselectivity and enantioselectivity. Initially the reaction was performed in various solvents, such as DCM, tetrahydrofuran (THF) or toluene, with cyclohexanone (2 equivalents). A good conversion was not obtained with these different solvents. The reactions were then performed in neat mixtures. Without any acid additive (Table 2, Entry 1) and with 20 mol % catalyst loading (0.26 mmol of pyrrolidine/g of MPP), only 33% conversion was achieved after 3 days. When 5 mol % of an acid additive was introduced (Table 2, Entries 2-4), the catalytic activity was significantly improved without affecting the diastereoselectivity and enantioselectivity. TFA was shown to be the most effective acid additive. However, the product selectivities would be reduced when excess TFA (>10 mol %) was added. The optimal catalyst and TFA loadings were 30 mol % and 10 mol %, respectively. Catalyst was recycled by filtration after the first run. Very low conversion would be achieved in the absence of additional acid additive. With the addition of 10 mol % of TFA, 45% conversion of the enamine-assisted Michael reaction was obtained after 30 h (Table 2, Entry 9). When the recovered catalyst was washed with dilute base ($NH_3$/THF) after the second run, 65% conversion was achieved after 48 h, with similar diastereoselectivity and lower enantioselectivity (83%) (Table 2, Entry 10).

In summary, MPP has been synthesized by using spherical MCF microparticles as a hard template. With a high crosslinker/monomer molar ratio, a rigid polymer was attained with a robust porous structure. The porosity of the MPPs was able to be controlled by using different amounts of monomer, and the BET surface area was varied from 100 $m^2/g$ to 550 $m^2/g$. The surface properties of the MPPs could be tailored by using different functionalized monomers. For example, MPPs were modified with surface benzylchloride and carboxyl groups. Pyrrolidine was successfully immobilized onto MPPs through imidazolium linkage. Michael addition of cyclohexanone to nitrostyrene over MPP-supported pyrrolidine provided conjugated adduct with excellent to diastereoselectivity and enantioselectivity.

EXAMPLES

General Information.

All solvents were used as obtained from commercial suppliers, unless otherwise noted. Centrifugation was performed on Eppendorf Centrifuge 5810R (4000 rpm, 10 min). $^1$H NMR spectra were recorded on Brucker AV-400 (400 MHz) instrument. Data for $^1$H NMR were reported as chemical shift (δ ppm), multiplicity (s=singlet, d=doublet, t=triplet, q=quartet, m=multiplet). PA-FTIR spectra were obtained with a Digilab FTS 7000 Series using a photoacoustic cell (MTEC Model 300). Gas liquid chromatography (GLC) was performed on Agilent 6890N Series gas chromatograph equipped with a split-mode capillary injection system and flame ionization detector, using Bodman Chiraldex γ-TA column (0.25 mm×30 m). C, H, N analyses were obtained with EAI CE-440 Elemental Analyzer. $N_2$ adsorption isotherms were obtained at 77 K using a Micromeritics ASAP 2020M system. Scanning electron microscopy (SEM) images were obtained with a JEOL JSM-7400F electron microscope (10 kV).

Synthesis of MPP.

Spherical MCF microparticles was synthesized according to Han, Y., Lee, S. S., Ying, J. Y. Chem. Mater. 2006, 18, 643, and used after vacuum degassing at 100° C. overnight. Styrene (Aldrich, 99%) and DVB (Aldrich, 98%) were purified in an alumina column to remove the polymerization inhibitors. Typically, monomer mixtures amounting to the silica weight were added to MCF following the wet-impregnation using DCM as solvent. A typical synthesis involved dissolving 0.6 ml of styrene, 0.6 ml of DVB, and 0.05 g (3% relative to total vinyl group) of AIBN (Aldrich, 98%) in 3.0 mL of DCM. This solution was injected into a flask with 1 g of dried MCF. After impregnation with the solution, the powder was vacuum dried at −78° C. to selectively remove DCM for 4 h, and subjected to freeze-vacuum-thaw cycles several times. The sample was sealed and equilibrated for 6 h at room temperature, and then polymerized by heating at 60° C. for 4 h, 80° C. for 3 h, and 100° C. for 2 h. The resulting material was washed extensively with chloroform and ethanol. It was dried at 80° C., and collected as a white powder. The powder was then mixed with NaOH (4 g) in ethanol (50 ml) and water (50 ml). The mixture was kept at 90° C., and stirred overnight. After filtration, the material was washed extensively with water, methanol and DCM. After drying in vacuum, a white powder was collected as MPPs. Elemental analysis showed more than 99% hydrocarbon components. MPP-Cl and MPP-COOH were synthesized by the same procedure with different monomers, as listed in Table 1.

Synthesis of MPP-Pyrrolidine.

DMF (30 mL), catalyst precursor E (126 mg, 0.5 mmol) were added to the dried MPP-Cl (1 g) sequentially. The suspension was stirred at 100° C. for 24 h, and filtered. The solid obtained was washed successively with methanol and DCM. After drying in vacuum, the white powder was collected and soaked in TFA (50% in 10 ml of DCM) overnight. The suspension was filtered, and the solid obtained was washed with saturated sodium bicarbonate aqueous solution, methanol and DCM successively. The resulting pale yellow powder was dried and collected as MPP-pyrrolidine (1.02 g). Compared with MPP and MPP-Cl, MPPP-pyrrolidine showed strong PA-FTIR NH peak (3300 $cm^{-1}$) and quaternary ammonium peak (1000-1200 cm$^{-1}$). The loading of pyrrolidine was 0.26 mmol/g of MPP based on elemental analysis (C, 81.83%; H, 7.05%; N, 1.12%).

Michael Addition of Cyclohexanone to Nitrostyrene.

In a typical experiment, MPP-pyrrolidine (0.26 mmol of pyrrolidine/g of MPP, 154 mg, 0.04 mmol), was used as the catalyst (30 mol % loading with respect to trans-β-nitrostyrene (20 mg, 0.13 mmol)). Cyclohexanone (3 mL) containing TFA (10 mol %) was added to the mixture, and stirred for 22 h at room temperature. The reaction mixture was filtered, and monitored by GLC (γ-TA column, major enantiomer t$_r$=16.0 min, minor enantiomer t$_r$=16.5, and diastereomer t$_r$=16.8, 17.0).

For the recycling experiments, the reaction mixture was filtered, and washed with DCM (3×5 mL) and NH$_3$/THF (10%, 2 mL). The residue was dried under vacuum, and used for the next batch under the conditions reported above.

TABLE 1

Synthesis and characteristics of MPPs.

| | Monomer$^a$ (ml/g of MCF) | Surface Area (m$^2$/g) | Pore Volume (ml/g) | Pore Size (nm) |
|---|---|---|---|---|
| MPP-A | A 0.6, B 0.6 | 532 | 0.76 | 10/25 |
| MPP-B | A 0.8, B 0.8 | 248 | 0.33 | 3.5/21 |
| MPP-Cl1 | A 0.95, C 0.25 | 209 | 0.25 | 5/20 |
| MPP-Cl2 | A 0.6, B 0.46, C 0.14 | 111 | 0.28 | 4/20 |
| MPP-COOH | A 0.6, D 0.6 | 210 | 0.26 | 3/13 |

$^a$A: DVB; B: styrene; C: 4-vinyl benzylchloride; D: acrylic acid.

TABLE 2

Michael addition of cyclohexanone to nitrostyrene over G.

| Entry | Catalyst (mol %) | Additive (mol %)$^a$ | Time (h) | Conversion (%)$^b$ | syn/anti$^c$ | ee$^c$ (%) |
|---|---|---|---|---|---|---|
| 1 | 20 | — | 72 | 33 | 97:3 | 97 |
| 2 | 20 | PTSA (5) | 30 | 35 | 98:2 | 97 |
| 3 | 20 | AcOH (5) | 22 | 11 | 96:4 | 92 |
| 4 | 20 | TFA (5) | 22 | 53 | 97:3 | 95 |
| 5 | 25 | TFA (7.5) | 22 | 68 | 97:3 | 94 |
| 6 | 25 | TFA (10) | 22 | 50 | 95:5 | 94 |
| 7 | 25 | TFA (15) | 22 | 67 | 98:2 | 89 |
| 8 | 30 | TFA (10) | 22 | 83 | 97:3 | 95 |
| 9$^d$ | | TFA (10) | 30 | 45 | 96:4 | 91 |
| 10$^e$ | | TFA (10) | 48 | 65 | 93:7 | 83 |

$^a$Fresh stock solution was made in cyclohexanone/DCM.
$^b$Determined by GLC.
$^c$Measured by chiral GLC.
$^d$First recycle. Catalyst was used after filtration without washing, and fresh TFA was added during the reaction.
$^e$Second recycle. Catalyst was washed with NH$_3$/THF, and fresh TFA was added during the reaction.

The invention claimed is:

1. A particulate material comprising porous polymeric microparticles having a mesoporous structure which has a bimodal distribution of pore sizes as measured by nitrogen absorption, said polymeric microparticles comprising a crosslinked polymer comprising crosslinking monomer units and non-crosslinking monomer units, wherein at least one monomer unit has a functional group which is a catalytic group;
wherein at least one type of the crosslinking monomer units is derived from divinyl benzene, and
wherein at least one type of the non-crosslinking monomer units is derived from styrene or a derivative thereof.

2. The particulate material of claim 1 wherein the crosslinked polymer has a mole ratio of crosslinking monomer units to non-crosslinking monomer units of at least about 1:4.

3. The particulate material of claim 1 wherein the monomer unit having the functional group is a non-crosslinking monomer unit.

4. The particulate material of claim 1 wherein the functional group comprises a pyrrolidine group.

5. The particulate material of claim 1 having pores sizes between about 1 and about 10 nm and pore sizes between about 10 and about 30 nm as measured by nitrogen absorption.

6. The particulate material of claim 1 having a BET surface area of between about 100 and about 1000 m$^2$/g.

7. The particulate material of claim 1 having a pore volume of between about 0.1 and about 1 ml/g.

8. The particulate material of claim 1, said particles comprising less than about 5% inorganic material.

9. The particulate material of claim 1 wherein said material swells less than 1% at 20° C. in common organic solvents.

10. A process for making a particulate material comprising porous polymeric microparticles, said process comprising:
a) impregnating a porous microparticulate template material with a liquid comprising one or more monomers comprising a crosslinking monomer and a non-crosslinking monomer, wherein at least one of the monomers comprises a functional group selected from the group consisting of a catalytic group and a functional group capable of being converted into a catalytic group;
b) polymerising the one or more monomers in and/or on the template material to form a polymer; and
c) removing the template material to produce the particulate material, said particulate material comprising the porous polymeric microparticles having a mesoporous structure which has a bimodal distribution of pore sizes as measured by nitrogen absorption, said polymeric microparticles comprising a crosslinked polymer comprising crosslinking monomer units and non-crosslinking monomer units; and
d) if the functional group is not a catalytic group, reacting the polymer so as to introduce catalytic groups onto the surface of the particles of the microparticulate material;
wherein the crosslinking monomer comprises divinyl benzene, and
wherein the non-crosslinking monomer comprises styrene or a derivative thereof.

11. The process of claim 10 wherein the microparticulate template material is inorganic.

12. The process of claim 10 wherein the microparticulate template material is mesocellular siliceous foam.

13. The process of claim 10 wherein the molar ratio of the crosslinking monomer to the non-crosslinking monomer is at least about 1:4.

14. The process of claim 10 wherein the liquid comprises a thermal initiator, and step b) comprises heating the liquid in and/or on the template material so as to polymerise the monomer(s).

15. The process of claim 10 wherein step c) comprises dissolving the template material in a solvent which does not dissolve the polymer.

* * * * *